United States Patent [19]

Harris

[11] Patent Number: 4,466,302

[45] Date of Patent: Aug. 21, 1984

[54] NUTATING SNAP ACTION SWITCH MECHANISM

[75] Inventor: Richard H. Harris, Raleigh, N.C.

[73] Assignee: International Business Machines Corporation, Armonk, N.Y.

[21] Appl. No.: 303,234

[22] Filed: Sep. 17, 1981

[51] Int. Cl.[3] ..... F16H 25/18

[52] U.S. Cl. ..... 74/100 R; 200/160; 200/68.1; 200/77; 250/229

[58] Field of Search ..... 200/160, 67 G, 68, 77, 200/5 E, 340, 339; 250/229; 74/100 R, 100 P

[56] References Cited

U.S. PATENT DOCUMENTS

| | | | |
|---|---|---|---|
| 1,828,059 | 10/1931 | Meuer | 200/339 |
| 1,969,263 | 8/1934 | Gaynor | 200/339 |
| 2,810,031 | 8/1957 | Hellstrom | 74/100 |
| 2,894,080 | 7/1959 | Herrmann et al. | 200/6 |
| 3,226,494 | 12/1965 | Hartz et al. | 200/5 E |
| 3,387,184 | 6/1968 | Angold | 200/160 |
| 3,567,888 | 3/1971 | Long | 200/160 |
| 3,943,307 | 3/1976 | Juery | 200/5 E |
| 4,145,590 | 3/1979 | Repplinger | 260/330 |
| 4,153,829 | 5/1979 | Murata | 200/340 |

FOREIGN PATENT DOCUMENTS

| | | | |
|---|---|---|---|
| 2810607 | 9/1978 | Fed. Rep. of Germany | 200/339 |
| 260410 | 3/1949 | Switzerland . | |

OTHER PUBLICATIONS

IBM, TDB, vol. 21, No. 9, Feb. 1979, pp. 3727–3728.
IBM, TDB, vol. 20, No. 11B, Apr. 1978, pp. 4885–4888.

*Primary Examiner*—Gary L. Smith
*Assistant Examiner*—Anthony W. Raskob, Jr.
*Attorney, Agent, or Firm*—Edward H. Duffield

[57] ABSTRACT

An electrical switch actuation mechanism is described. Principally useful for keyboard switch data entry devices, the mechanism operates by means of cammed surfaces to produce a generally nutating, rocking snap action. Depression of the key button moves a stem with cam surfaces on it which contact cammed surfaces on a rocking plate member. The action produces a first rocking motion in a first axis followed by second and third combined snapping and rocking actions about second and third axes in that plane, but at different angular orientations from the first action. A hypothetical vertical axis constructed through the plane of the rocking member will nutate or precess in a generally orbital fashion about a central pivot point. The motion of the plane of the rocking plate may be easily coupled to any of a variety of transducer devices be they contacts, capacitive, optical or inductive.

5 Claims, 7 Drawing Figures

FIG. 1
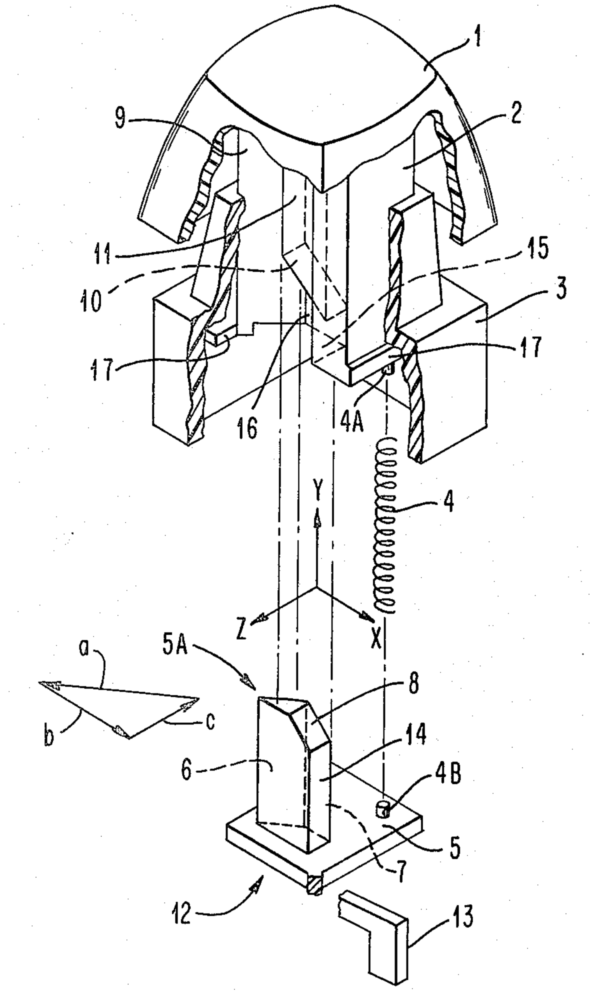
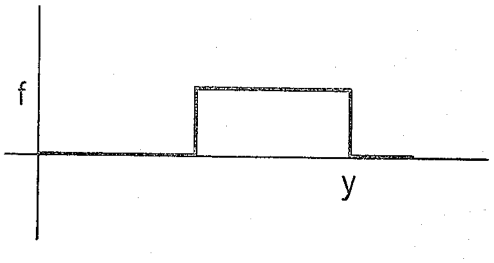
FIG. 2

NUTATING SNAP ACTION SWITCH MECHANISM

BACKGROUND OF THE INVENTION

This invention relates to keyboards and key switch entry mechanisms in general and specifically to the mechanical snap action mechanism for such key switches.

PRIOR ART

Numerous cam action snapping actuators for key switches are known in the prior art. These devices take many known forms. For example, U.S. Pat. No. 3,567,888 shows one such design in which the cam follower pivoted to a key stem of a push button is arranged to follow a molded or machined track and cam member to provide snap action of engaging electrical contacts. While only two moving parts are employed, the parts are connected together through a pivot and precise machining and tolerance conditions with careful fitting together of the assembled parts is required for reproducible operation. This is a deficiency in today's highly competitive environment where reduction of manufacturing costs and simplification of mechanisms are highly sought after.

Swiss patent No. 260410 illustrates another type of mechanism in which a pivoted lever handle with intermediately pivoted connectors apply off center forces to a generally nutatable or oscillatable plate member. While the actions of the operable plate may be similar in some respects to those desired in the present invention, the complexity of the device with carefully machined parts and fitting together of numerous pivots is a distinct drawback.

Still another class of switches utilize inclined ramps or cam surfaces to snap a resilient spring member. A typical such mechanism is shown in U.S. Pat. No. 3,387,184 where an inclined ramp and cam surface fixed to a moving plunger operates on a spring wire contactor. Such devices which operate on stessed wire spring members to create contact suffer from contact bounce and mechanical breakage as is well known. Also, such devices may be more complex to manufacture and assemble.

General cammed members contained in a key stem or push button for operating contact devices are of course well known. For example, the previously mentioned Swiss patent and the U.S. Pat. No. 3,387,184 mentioned above show such types of structure. Another such device may be seen in U.S. Pat. No. 3,943,307 in which two separate spring loaded slide members each having separate paths are movable against spring loading into a convergent path. There are cams on the slides to engage with and move actuators of first and second switches and the arrangement is such that one slide moves to block the path of the other. Such devices or key locks which prevent depression of multiple keys simultaneously are similarly well known.

While a great variety of mechanisms exists, the foregoing are exemplary of the general state of the art insofar as is known to the Applicant. All of the mechanisms are somewhat more complex, contain more numerous parts or more unreliable structures and are more difficult to assemble than would be ideally desired in today's environment.

OBJECTS OF THE INVENTION

In view of the foregoing deficiencies in the known prior art, it is desired to provide an improved switch actuator mechanism that provides snap actions both on the make and on the break actuation, make and break being terms of art known in the industry.

It is a further object of this invention to provide an improved actuator that has fewer moving parts and which employs parts of a simple and reliable unstressed design and manufacture.

A further object of the invention is to provide a universally adaptable snap action mechanism that can be utilized with optical, mechanical, electrical proximity or capacitive sensing transducers for data key entry.

A further object of the invention is to produce a switch having a feedback characteristic that notifies the operator that actuation has occurred, that is non-teasible and that may be used with mechanical diaphragm switches in particular.

SUMMARY

The foregoing and still other objects not mentioned for the present invention are met in an electrical switch actuating mechanism having only two molded plastic moving parts. A rocking base plate provided with a central pivot is also provided with a molded upstanding cam surface which interacts with molded cam surfaces on a key stem arranged in opposition thereto. The base plate and the key stem are biased apart by a simple resilient compression spring means. The compression spring also supplies a rocking torque about the pivot of the rocking plate tending to hold the plate tilted in a given direction against a base. Upon depression of the key button with the cooperating cam surfaces on the key stem and base plate, the base plate may be rocked in one or more directions about the pivot point when the force of the spring has been overcome. By properly arranging the cam surfaces, action in a first axis can be made to occur in a reversible manner followed by a sudden irreversible, snap action. This may be followed by other snapping motions in other axes, thereby causing the rocking plate to rock about its central pivot in a generally orbital or nutational motion from its starting position and back to its rest position as the key stem is first depressed and then released. These actions are controlled to occur at precise positions in the key stem travel and with a precisely repeating force characteristic. The output or motion of the rocking plate may be sensed at its periphery by allowing the plate to operate transducer contacts of any desired type well known in the art. Assembly of the mechanism is exceptionally easy. A molded plastic rocking plate is inserted in a housing with its pivot bearing against a base support. The compression spring is fitted over a projection on the rocking plate and is engaged with a similar projection on the key stem which is inserted in the top of a housing surrounding the rocking plate means. This completes the assembly. Switches of this character may be ganged together in an apertured universal housing having spaces for numerous key buttons or may be placed in individual housings and grouped together or apart over the surface of a circuit board or similar means which can contain the transducer elements actuated by the snapping key mechanism.

As a preferred embodiment and as the best mode contemplated for carrying out the present invention, a further description is given with regard to a specific embodiment shown by way of example and not by limitation in which the following is a brief description.

BRIEF DESCRIPTION OF DRAWINGS

FIG. 1 illustrates an exploded partially cut away view of a single key actuator assembly mechanism according to the present invention.

FIG. 2 is a typical force and displacement chart showing forces and displacements for the mechanism.

DETAILED SPECIFICATION

Figure 3A:
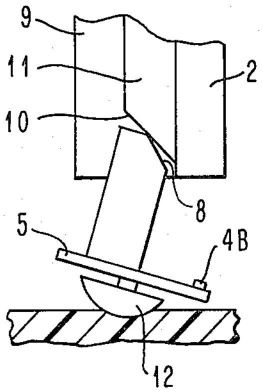
FIGS. 3A, 3B and 3C illustrate a partial schematic portion of the actuator in three different stages of operation taken from a viewpoint of the left oblique in FIG. 1.

The preferred embodiment of the present invention is described in FIG. 1. The electrical switch actuation mechanism is shown in an exploded pictorial form. The mechanism operates generally by means of cammed surfaces to produce a series of orbitally oscillating or nutating, rocking snap actions of a rocking plate 5. Depression of a key button 1 moves a key stem 2 on which the key button rides. The stem 2 has a plurality of different cam surfaces described in greater detail below which interact with a cam member on the rocking plate 5. These, in concert with the action of spring 4, produce a first rocking motion about a first axis with a snap actuation at a given point in the travel. This is followed by a second snap and rocking action of the rocking plate 5. These occur about second and third axes in the same general plane of the rocking plate but at different angular orientations from the first actions. The result is that an intersecting vertical axis through the plane of the rocking member will generally precess or nutate in an orbital fashion about the central pivot point.

In FIG. 1, key button 1 of molded plastic may be attached to a molded plastic stem 2 slidably supported in a guide or housing of molded plastic 3. A compression spring 4 of ordinary helical sort is shown for mounting between the rocking plate member 5 and the underside of the key stem 2 by a mounting means 4A and 4B shown to be projections in the plastic molded parts. The helical coil spring can slide over these projections to prevent it sliding laterally under the compression forces generated.

A three dimensional axis diagram of the X, Y and Z axes is illustrated in FIG. 1 as an aid to understanding the motions.

A cam surface member 5A is molded on or attached to the base plate 5. Member 5A has numerous camming surfaces and angles thereon shown generally as surfaces 6, 7, 8 and 14. These surfaces interact at various times with a molded set of cam surfaces on key stem 2. These include the cam surfaces 9, 10, 11, 15 and 16 and will be described in greater detail below.

The interaction of the various cam surfaces produce rocking motions of the plate 5 about a central pivot 12. They thereby impart motion to an affixed interrupter or switch actuating flag member 13 which is rigidly attached to plate 5. In FIG. 1, member 13 has been broken away and rotated approximately 45° to enable a better view of the pivot 12 to be obtained.

If a view is taken looking down on the top of member 5A, the motions which will be produced in various directions are identified with regard to the small vector diagram positioned adjacent to member 5A. The motions produced are first in a direction identified by the small letter a in the diagram which represents the rocking motion in the XZ plane in a first direction. The depression of a key stem will be followed by another rocking motion in the XZ plane with the direction of an arrow identified by letter b. This is primarily about the Z axis as can be seen and is followed by a return to the original position identified by the small letter c which is a rotation in the XZ plane, primarily about the X axis. As may be easily understood, the flag member 13 can be used to actuate a wide variety of transducer or sensor means. For example, the flag member 13 can actuate electrical contacts (not shown), magnetic proximity, capacitive, inductive, or optical members. Similarly, the force of flag 13 moving with the rocking plate 5 can be utilized to operate diaphragm switch mechanisms positioned beneath the member 5 (not shown).

Assembly of the mechanism shown in FIG. 1 begins by inserting the stem 2 into the guide 3. Stem 2 would typically have a molded flange or upper direction stopping means to keep it from moving too far upward. This is shown generally as the molded flange 17 which cooperates with the underside of an aperture in the housing 3 to limit the upward direction travel to an extreme position.

Spring 4 is then placed on the stem 2 over the mounting point 4A. Plate 5 is then positioned with point 4B inside the other end of spring 4. A bottom support (not shown) is assembled under all of the various key actuator positions on a keyboard so that each plate 5 compresses the respective spring 4 and the cam surfaces 7, 8 and 14 moving into proper relationship to the stem 2 and its cam surfaces 10, 15 and 16. As thus assembled, the cam surface 8 will be slightly below cam surface 10. Surface 7 will contact surface 16, and surface 14 will contact the lower part of surface 15. Spring 4 creates a moment or torque on plate 5 about the central pivot point 12 that will insure this relationship with cam surfaces. Assembly is concluded by pressing a button 1 onto the top of each stem 2.

A more complete description of the various cam surfaces and their orientation when the key button is not depressed is given as follows:

Surface 6 carried on the cam member of rocking plate 5 is generally parallel to the Y axis and intersects the Z and X axes at 45°. This surface is facing away from the observer in FIG. 1.

Surface 7 is generally parallel to the XY plane and faces away from the observer at 45° in FIG. 1.

Surface 8 is generally parallel to the Z axis and intersects the X and Y axes at 45° facing the observer in a slanted fashion in FIG. 1.

Surface 14 is parallel to the YZ plane and, completes the surfaces of the cam member molded as a part of the rocking plate 5.

Cam surface 9 bourne by the key stem 2 is generally parallel to the Y axis and intersects the X and Z axes at 45°. This faces the observer in FIG. 1 and is also parallel with surface 6.

Cam surface 10 is generally parallel to the Z axis and intersects the X and Y axes at 45°. It faces away from the observer in FIG. 1 and is also parallel to the surface 8.

Surface 11 is generally parallel to the XY plane facing the observer in FIG. 1 and is also parallel with surface 7.

Surface 15 is parallel to the YZ plane, facing away from the observer in FIG. 1, and is coplanar with surface 14.

Surface 16 is parallel to the XY plane facing the observer in FIG. 1 and is also coplanar with surface 7.

All of the surfaces described are generally flat and have straight edges which may be provided with slight bevel, curvature or edge relief to reduce wear and to provide smooth operation. The angles of the surfaces and the actual number of surfaces may be varied to change the forces at different points in a touch curve to be described later.

Force applied to the keytop 1 will cause stem 2 to travel downward in guide 3 compressing spring 4 and causing sliding to occur between various surfaces. In a first step, the sliding will occur between surfaces 7 and 16 and also between surfaces 14 and 15. Surfaces 8 and 10 will approach each other. This provides a low force key travel of key motion which will be described in greater detail later with regard to FIG. 7.

Figure 7:
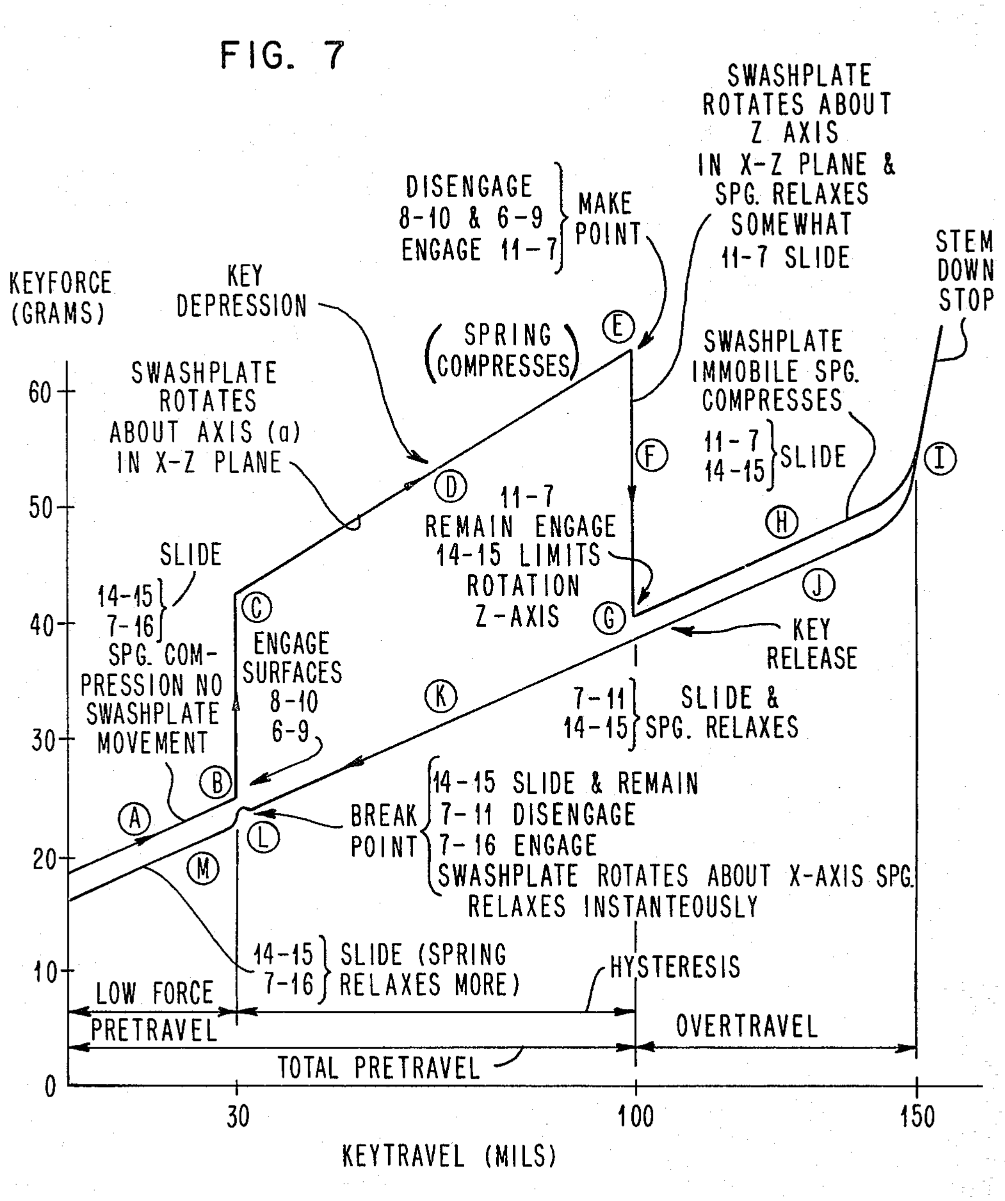
FIG. 7 illustrates a detailed key force and key travel chart explaining the various actions of engagement and disengagement of the cam surfaces for the preferred embodiment of the invention.

When surface 8 contacts surface 10, a sudden increase in force without further key deflection will be experienced. This results in the simultaneous engagement of surfaces 9 and 6 and surfaces 8 and 10. The key force now will create forces that cause the rocking plate 5 to rotate counter clockwise so that spring 4 will be further deflected upward as the rocking plate rocks as well as for further compression produced by further downward travel at the key stem 2. The top of the rocking plate identified as portion 5A moves in the direction shown by the small letter a in the diagram as plate 5 rotates about point 12. This provides the high force portion of the pretravel that is shown in FIG. 7 and discussed in further detail below.

Notice that the left corner of the rocking plate 5 shown in FIG. 1 will move downward while the right corner moves upward, while the front and rear corners, respectively, merely rotate. It may be seen that the plate 5 is generally planar and is rotating about an axis in the XZ plane, generally 45° to the XZ axes.

Figure 5:
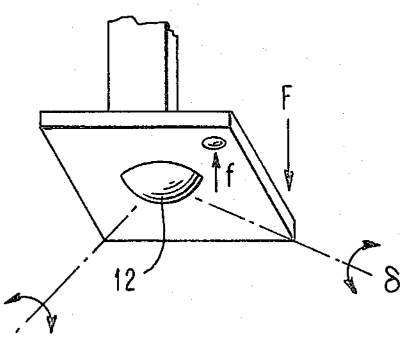
FIG. 5 illustrates a simplified view of a rocking plate of the preferred embodiment and illustrates the nature of some of the forces and motions encountered.

As the rocking plate 5 rotates counter clockwise, engagement of areas between surfaces 8 and 10 will be decreased. The make point of the switch defined as that at which actuation should be defined, occurs when the engagement between surfaces 8 and 10 decreases to zero and there is no longer any surface left to maintain the counter clockwise position of the cam member and rocking plate 5. At the "make" action point, surfaces 7, 11 will slide relative to each other until surface 14 and 15 make contact with one another or force f in FIGS. 2 and 5 is applied and the upper end of plate 5A will move in the direction shown by arrow b in FIG. 1. Force f replaces the normal force between surfaces 14 and 15. Therefore, when f is applied, surfaces 14 and 15 are normally touching.

At this time, the key force will decrease instantaneously because the forces generated between surfaces 8 and 10 will be removed and spring 4 will be allowed to extend slightly to a lower force position. At this instant, the left and right corners of the rocking plate 5 will be returned toward the initial vertical position and the front corner will be in the downward position while the rear corner is in an upward position. For simplicity, the left and right corners are those shown in FIG. 1, the front corner is that to which the flag actuating member 13 is attached and the rear corner is diagonally opposite to that at which 13 is attached.

Additional depression of key stem 2 will not change the position of the rocking plate 5. To further guarantee this, the lower part of surface 7 may be relieved slightly to eliminate even minute movements of the rocking plate 5. In this position, the key force is caused by spring 4 being compressed and by sliding friction between surfaces 14, 15 and surfaces 7 and 11.

When the key force is reduced by removing the force applied to key button 1, stem 2 will move upward under the impetus of spring 4 and the engagement of area between surfaces 7, 11 will be decreased. The "break" point at which the end of actuation should be detected will occur when the area of contact between surfaces 7 and 11 is reduced to zero. This will allow the upper end of rocking plate 5 shown as end 5A to return to the initial position along path c in FIG. 1. At this position, each corner of the rocking plate 5 will have returned fully to its initial position. A slight decrease in key force is experienced because spring 4 will instantaneously extend to a slightly lower force position upon the disengagement of surfaces 7 and 11.

The aforementioned instantaneous increases and decreases in spring force are accompanied by snap actions which are irreversible and cannot be teased by a human operator. Any given switch sensing technique can be employed with this mechanism. Either the front or rear corners of the rocking plate 5 can be utilized to trigger and sense make and break actions whether they are normally opened or normally closed operations. If both corners are used on the same rocking plate, a transfer switching function can be utilized as is known in the art.

As depicted in FIG. 1, the actuator flag 13 is shown to be the type that could be employed with optical sensors. Flag 13, shown in FIG. 1, actually projects straight out toward the observer in the figure and would obscure the pivot point 12. For clarity then, flag 13 has been shown broken and rotated away 45° to the right in FIG. 1. At the make point in the switch actuation, the flag 13 will snap downward with some force to interrupt a light beam or to actuate key contacts or proximity sensing mechanisms not shown. During the second part of key travel, the flag will snap upward to its original position. Any type of proximity or contact system could be employed for sensing the motions of this key mechanism.

As will be described below, an excellent force travel and touch profile is achieved by this device. The make and break points are crisply defined and are positive and non-teasible in actuation. The low force pretravel portion of key motion is desirable and the physical key hysteresis or separation between the make and break points is a similarly well known desirable feature.

FIG. 2 is a plot of force and deflection at the output end of the flag member 13 at the corner of plate 5 and the displacement y of keystem 2. FIG. 2 is to be read as follows. There is initially no downward motion of flag 13 and no force exerted by flag 13. The force f results when plate 5 rocks flag 13 downward by the rotation about the axis indicated with the Δ in FIG. 5. The small f is the reaction force or force that can be generated at the corner of the plate 5 whereas the large capital F is the force produced by spring 4. The small letter f could represent the reaction of a small dimple for applying force to a diaphragm membrane switch, for example, or the output of flag member 13 could be employed for this purpose.

Figure 6:
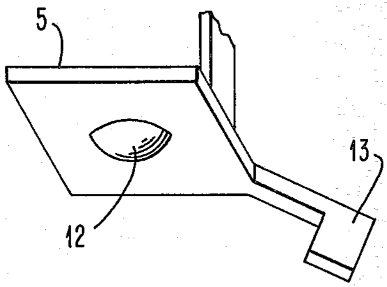
FIG. 6 illustrates another form of the preferred embodiment of the rocking plate member.

FIG. 6 shows the flag member 13 affixed to plate 5 as well as a pivoting point formed as dimple 12 on the bottom surface of plate 5.

Figure 3B:
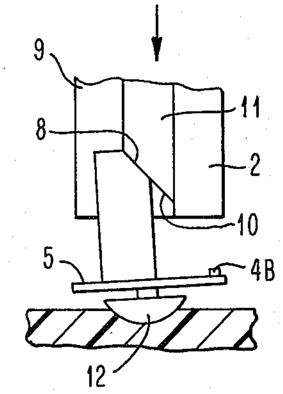
Figure 3C:
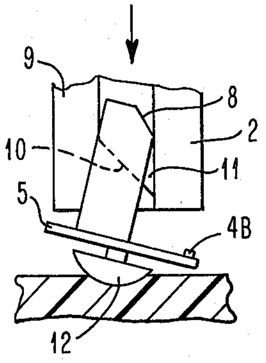
Figure 4A:
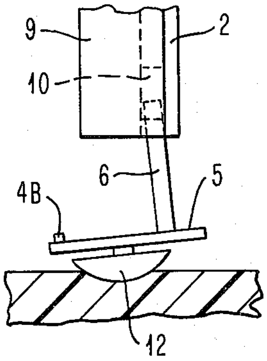
FIGS. 4A, 4B and 4C illustrate sequential views of the operative components taken from a 90° orthogonal view to that shown in FIGS. 3A, 3B and 3C of the mechanism in FIG. 1.
Figure 4B:
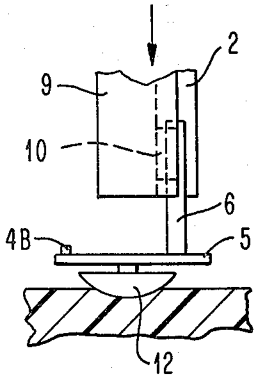
Figure 4C:
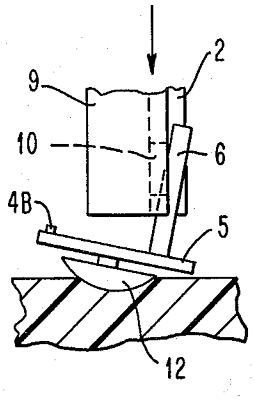

FIGS. 3A through 3C illustrate a view taken from the left front oblique in FIG. 1 of the operative portions of the mechanism. FIGS. 4A-4C illustrate another view of the operative portion of the mechanisms taken at 90° to the views represented in FIG. 3A or from the left rear direction of the views in FIG. 1. These diagrams sequentially indicate the position of the operative elements at various portions in the key travel in key stem 2 and are to be used in conjuntion with FIG. 7 which is a key force and displacement chart.

Turning to FIG. 7, the total key force in grams is plotted against the total key travel in thousandths of an inch. A certain amount of precompression is applied by assembling spring 4 in a partially compressed state. The precompression serves a dual purpose in maintaining the key button and stem 1 and 2 in the upward position and providing a certain threshold of force that must be exceeded before the key button 1 will begin to move. This is illustrated by approximately 18 gram initial preload force required to cause key travel to begin in FIG. 7.

In the segment of the draft shown by the circled letter A, spring 4 will begin to compress, but there will be no movement in plate 5. During this portion of the key travel, surfaces 14, 15 and 7 and 16 slide over one another. At point B in the diagram, surfaces 8, 10, and 6, 9 engage one another and key travel temporarily stops until sufficient force is applied. Approximately 41 to 42 grams of force are required to produce sliding between these surfaces. At point C, sliding among the cam surfaces 8, 10, and 6, 9 begins and rocking plate 5 will rotate about an axis in the XZ plane identified in FIG. 1 as the small letter a. When sliding between these aforementioned surfaces occurs, spring 4 can compress further during this segment shown in FIG. 7 identified by the letter D. At point E in the figure, a sudden snap action occurs which produces the tactile feel defining the make point. It is at this point that the cam surfaces 8, 10 and 6 and 9 disengage suddenly while surfaces 11 and 7 engage. During the portion of the diagram identified by the circled F, plate 5 will rotate about the Z axis in the XZ plane and spring 4 will relax somewhat, while surfaces 7 and 11 slide over one another. At the point labeled G in the diagram, surfaces 7 and 11 remain engaged while either surfaces 14 and 15 or force f limit the rotation of plate 5 about the Z axis. During this portion, spring 4 has been extending slightly and the relaxation has ended when plate 5 reaches the limit of rotation. Throughout the section labeled H in the diagram, plate 5 is immobile and spring 4 compresses further, with surfaces 11, 7 and 14, 15 sliding over one another. At point I, the key stem 2 reaches a down stop and can be depressed no further. A rapid or vertical increase of force with no further key travel occurs at this point.

The release path is somewhat different. The release curve has been drawn to retrace the original form, in part, but has been shown slightly offset in the figure so that the path may be observed. During the section labeled J in FIG. 7, the key is being released as spring 4 is relaxing. Throughout the segment K surfaces 7, 11 and 14, 15 slide over one another, while spring 4 relaxes further. At point L, commonly called the break point, surfaces 14 and 15 slide over one another while surfaces 7 and 11 disengage suddenly while 7 and 16 engage suddenly. At this point, plate 5 will rotate about the X axis suddenly, while spring 4 will relax in a sudden snap action that produces a tactile release feel defining the break point.

The total displacement in key travel between the make point E and the break point L is defined as hysteresis. The displacement between 0 and point D is called the low force pretravel section of the curve. Between points G and I it is called overtravel. The travel of the key until the make point is reached is called total pretravel.

Continuing now with the operation of the key mechanism from point L, as the force on the key button is further relieved, surfaces 14, 15 and 7 and 16 slide over one another and spring 4 relaxes until the original position is attained at the end of section M of the curve.

Returning to FIG. 1, it will be noted that a bottom support plate in the sensing means to interact with actuating flag 13 were not shown. Numerous sensors could be used. Optical beam interrupters which may be interrupted by the flag could be employed. These consist of well known optical source and sensors with or without fiber optical conductors to conduct light to and from the vicinity of flag 13.

The mechanism may be easily made of molded plastic parts, there being only three moldings at a minimum and only two moving parts. A single spring element is required for the entire key actuator assembly. It produces an excellent feedback characteristic which is non-teasible and in effect, instantaneous snap action. It is amenable to the actuation of many different types of transducers as noted above. Any type proximity sensors such as an electrical capacitance, inductance, or optical interruption can be employed. The actuator can be utilized in the normally open or normally closed mode and lends itself easily to actuation of elastic diaphragm switches as pointed out earlier.

ADVANTAGES

As noted above, this specific snap action and clearly defined make and break points make this key mechanism ideally suited to a variety of industrial and business machine applications. The adaptability of the mechanism to a variety of sensing or transducer types is similarly important. Capacitive keyboards employing capacitive proximity sensors are well known in the keyboard art and are extremely important in today's marketplace. Similarly, elastic diaphragm contact switches are equally important and provide another viable segment of keyboard technology. The adaptability of the present snap action mechanism to all of these environments is an important attribute. Its simplicity of structure and assembly is apparent and lends itself easily to automated production techniques including but not limited to automatic assembly mechanisms. These features plus the essentially non-corrosive, non-conductive and non-stressed nature of the internal working parts of the actuator make for a highly reliable and universally adaptable actuator mechanism as will be appreciated by those of skill in the art.

Having thus described my invention with regard to the best mode and preferred embodiment contemplated, it will be appreciated that numerous variations in the exact duration of cam surface contacts, their form and force variation characteristics and the like may be made by those of skill in the art without departing from the essence of the invention. Therefore, it is desired that the following claims describing the invention be viewed by way of explanation and not limitation.

Having thus described my invention, what I desire to protect by Letters Patent is:

1. A snap action switch mechanism, comprising:
a housing having an opening;
a key stem slidably received within said opening with means on said key stem for limiting sliding;
a resilient biased spring means for biasing said key stem toward a position;
a rocker plate mechanism having a generally planar base, a generally centrally located pivot means on one side thereof and a generally upstanding first cam member affixed to the opposite side of said planar base at a position not colinear with said pivot, and means for mounting one end of said resilient biased spring means on the surface opposite the surface having said pivot;
said rocker mechanism and said key stem being generally coaxially arranged in said housing with said resilient biased spring means positioned therebetween and tending to bias said rocker and key stem in opposite directions and to bias said rocker eccentrically in a given direction about said pivot;
a second cam member on said key stem positoned to contact said cam member on said rocker plate;
said first and second cam members being configured to impart motions to said rocker mechanism when said key stem is depressed against the urging of said resilient biased spring means, said motions being to first rock said mechanism in a first axis about said pivot and, with continued depression of said key stem, to cause a sudden transfer of engagement of said first and second cam members and to allow a sudden spring urged snap motion of rocking in a second axis about said pivot; and
upon release of depression of said key stem, said cam members and spring causing a sudden snap motion restoration of engagement of the surfaces originally engaged at the start of said depression of said key stem, said restoration producing a rocking in a third axis about said pivot and restoring said rocker mechanism to its original starting positions.

2. Apparatus as described in claim 1 and further comprising:
a sensor or transducer actuating means attached to said rocking plate for activating a sensor or transducer in response to said sudden snap actions of said mechanism.

3. Apparatus as described in claim 1 or claim 2 wherein:
said cam members are arranged to provide said snap motions in said second and third axes respectively which are orthogonal to one another.

4. Apparatus as described in claim 1 or claim 2 wherein:
said rocker plate further includes a projection for actuating a sensor or transducer.

5. Apparatus as described in claim 1 or claim 2 wherein said rocking plate comprises a projection for mechanically actuating switch contacts, said projection being on the same side of said rocker plate as said pivot.

* * * * *